United States Patent [19]
Hamana

[11] Patent Number: 5,253,135
[45] Date of Patent: Oct. 12, 1993

[54] MAGNETIC HEAD HAVING A TAPE SLIDING SURFACE AND PROJECTIONS FORMED ON THE TAPE SLIDING SURFACE

[75] Inventor: Junji Hamana, Hanno, Japan

[73] Assignee: Canon Denshi Kabushiki Kaisha, Chichibu, Japan

[21] Appl. No.: 667,314

[22] Filed: Mar. 12, 1991

[30] Foreign Application Priority Data

Mar. 13, 1990 [JP] Japan .................. 2-63892
Apr. 24, 1990 [JP] Japan .................. 2-109660
Aug. 31, 1990 [JP] Japan .................. 2-230272

[51] Int. Cl.$^5$ ............... G11B 15/60; G11B 5/105
[52] U.S. Cl. ................... 360/130.21; 360/130.31
[58] Field of Search ........... 360/130.21, 130.3, 130.31, 360/122

[56] References Cited

U.S. PATENT DOCUMENTS

| | | | |
|---|---|---|---|
| 4,491,891 | 1/1985 | Shiba | 360/130.21 |
| 4,553,186 | 11/1985 | Kawakami | 360/130.21 |
| 4,894,737 | 1/1990 | Hamana et al. | 360/130.21 |
| 4,926,278 | 5/1990 | Schoenmaker | 360/130.21 |
| 4,962,438 | 10/1990 | Kunze | 360/130.21 |
| 5,134,536 | 7/1992 | Komatsu et al. | 360/130.21 |

FOREIGN PATENT DOCUMENTS 63-91809 6/1988 Japan .
64-59605 3/1989 Japan .

Primary Examiner—John H. Wolff
Attorney, Agent, or Firm—Spencer, Frank & Schneider

[57] ABSTRACT

A magnetic head for recording information on or reproducing information from a magnetic tape which slides relative to a tape sliding surface of the head while being pressed against the tape sliding surface by a pad. The magnetic head has a pair of projections on its tape sliding surface. The projections are disposed so that the ends of the pad, protruding beyond the edges of the tape, make contact with the projections. The projections are made by depositing liquid resin on the tape sliding surface using a screen printing process. The surfaces of the projections have traces of a fine mesh of a screen plate employed in the screen printing process.

22 Claims, 8 Drawing Sheets

MAGNETIC HEAD HAVING A TAPE SLIDING SURFACE AND PROJECTIONS FORMED ON THE TAPE SLIDING SURFACE

BACKGROUND OF THE INVENTION

1. Field of the Invention

The present invention relates to a magnetic head on which a magnetic tape slides with a pad pressing it so as to record or reproduce information on the magnetic tape, and to a method for manufacturing such a head.

2. Description of the Prior Art

In cassette tape recorders or the like, magnetic recording or reproduction of audio signals or the like is carried out on or from a magnetic tape during relative motion between the magnetic tape and a magnetic head. To maintain good and uniform contact between the magnetic tape and magnetic head, a pad for pressing the magnetic tape onto the magnetic head is disposed on a tape cassette.

The pad, on the one hand, improves the contact between the magnetic tape and magnetic head, but, on the other hand, it increases the sliding friction of the tape, which not only results in wow and flutter associated with tape speed instability, but also increases abrasion of the magnetic tape.

To overcome this problem, Japanese utility model application laying-open No. 63-91809 proposed the following technique to reduce the pressure of the pad on the magnetic tape: a pair of projections are disposed on the sliding surface of the recording head in such a manner that the magnetic tape passes between the projections, which are placed under the top and bottom portions of the pad.

FIGS. 1A and 1B are perspective views showing constructions of such magnetic heads for conventional cassette tape recorders.

As shown in these figures, a 2- or 4-channel magnetic core is provided in the center of a magnetic tape sliding surface 4 of a magnetic head 1. A magnetic tape 6 is pressed against this magnetic tape sliding surface 4, by a pad 15 shown by broken lines. The magnetic tape 6 moves in the direction indicated by the arrow A in FIG. 1B so as to slide on the magnetic core 5, thereby performing recording or reproduction.

In general, the magnetic tape sliding surface 4 is composed of a case 2 made of a metal, the windows of the case 2, the magnetic core 5, and a fixing member that fixes the above elements in their positions. A pair of rectangular projections 17 are disposed on the magnetic tape sliding surface 4 in such a manner that they are placed at either side of the magnetic tape 6, and are elongated like a band along the sliding direction A of the magnetic tape 6. The top and bottom portions of the pad 15 protruding beyond both sides of the magnetic tape 6 are pressed against the projections 17 with stronger pressure so that the pressure of the pad 15 against the magnetic tape 5 is reduced, thereby eliminating the above-mentioned problems.

The projections 17 on the sliding surface 4 are formed by the method, for example, disclosed in Japanese patent application laying-open No. 1-59605 (1989). In this method, a mask, which has mask windows at positions corresponding to the projections 17 on the magnetic tape sliding surface 4, is placed on the sliding surface 4. The projections 17 are formed by a method for physically forming films, such as metal spraying, vacuum evaporation, sputtering, electrodeposition, or the like.

The film formation, in general, is carried out after the magnetic tape sliding surface 4 has been subjected to mirror-like finishing. Owing to a sudden rise in temperature, this causes core deviation at the gap of the magnetic head at which the core ends are butted. This may result in deterioration in the contact between the magnetic tape 6 and the magnetic head 1, and may degrade the electromagnetic conversion characteristics of the head. Thus, when the projections 17 are formed by the metal spraying, vacuum evaporation, or sputtering, the speed of film formation cannot be increases beyond a certain limit, which hinders productivity.

In addition, metal spraying cannot form the film with sufficient precision, and hence the projections 17 must be initially made thicker than the desired thickness, and then undergo a precise finish cut in order to achieve the desired thickness, which is an extra process.

Furthermore, electrodeposition cannot be used to form a film on a resin material. Hence, when the projections 17 are formed by electrodeposition, they can be formed only on the metal portions and not on the fixing member, which is made of resin. This will unduly when the space between the projections 17, and hence the pad 15 cannot be positively positioned on the projections 17 when the magnetic tape 6 slides on the magnetic head. This may reduce the effect of the projections 17. In particular, in a 4-channel magnetic head, while the height of the window of the case is determined at 4.5 mm, that of the pad 15 is specified as more than 5 mm. Consequently, the dimensions of the top and bottom portions of the pad 15 which encounter the projections may be as small as (5.0−4.5)/2=0.25 mm. Considering the mounting looseness of the pad 15, it is easy to understand that the portions of the pad 15 positioned on the projections 17 are very unstable.

When the projections 17 are formed by metal spraying, vacuum evaporation, sputtering, or the like, films can be formed on the fixing member, and hence the above-described problem does not take place. However, the projections 17 may peel off from the fixing member because the adhesion between the projections 17 and the fixing member differs from that between the projections 17 and the metal portions, and because the adhesion between the resin and the film is inferior to that between the metal and the film.

Furthermore, the projections 17 thus formed are compressed owing to the difference between the temperature during film forming and the temperature thereafter, and so they may separate from the sliding surface 4. This is because the shrinkage stress of the projections 17 themselves acts after the projections have been subjected to the thermal changes during the formation thereof. Thus, undergoing changes in temperature and humidity with time, parts of the projections 17 may separate from the sliding surface 4, or the entire projection 17 may fall from the sliding surface 4. This will result in a considerable increase in the sliding friction or in wow and flutter.

Incidentally, the running position of the magnetic tape 6 on the magnetic sliding surface 4 of the recording head 1 is regulated in various ways, conventionally.

FIG. 2 is a perspective view showing the construction of a conventional magnetic head device having a tape guide portion. In FIG. 2, each of two tape guides 21 has tape contact surfaces 22 which are uprightly disposed in the crosswise direction of the magnetic tape 6 so as to make contact with both sides of the magnetic tape 6. The tape contact surfaces 22, making contact with both sides of the tape 6, regulate the running position of the tape 6.

The magnetic head device of FIG. 2, however, has the problem that the tape 6 may curl in the vicinity of the tape contact surfaces 22 when the tape 6 snakes. In general, to prevent this and the electromagnetic conversion loss caused by the space between the tape 6 and the magnetic gap G on the magnetic tape sliding surface 4 of the head, the tape 6 is pressed to the magnetic tape sliding surface 4 of the magnetic head by the pad 15 disposed in a tape cassette 36 as shown in FIG. 3. The curl of the tape 6, however, cannot to prevented if the tape 6 snakes substantially. Thus, the electromagnetic conversion loss due to the space may increase, or the tape running position may shift by an amount corresponding the curl. This will result in tracking failure and a sharp deterioration in the electromagnetic conversion characteristics of the magnetic head, particularly for a 4-channel recording and reproducing head as shown in FIG. 2.

To improve the running problem of the magnetic tape 6, a magnetic head device has been proposed which has a tape guide portion which can stabilize the electromagnetic conversion characteristics.

FIG. 4 is a perspective view showing the construction of a conventional magnetic head device of such a type. As shown in this figure, each of the two tape guides 21 has a tape contact surface 22 which is uprightly disposed as a reference surface for regulating the position of the tape 6 by keeping contact with one side of the tape 6. Each of the two tape guides also has a curved sliding portion 23 for regulating the position of the tape 6 in the direction of the thickness thereof by keeping contact with the bottom of the tape 6, and an inclined portion 24 for forming an inclined surface with which the other side of the tape 6 makes contact.

With this arrangement, the other side of the tape 6 is pressed to the inclined portion 24 by setting the space between the tape contact surfaces 22 and the inclined portion 24 smaller than the width of the tape 6 which keeps contact with the curved sliding portion 23. This will increase the tension acting on the tape 6, which in turn presses the tape 6 to the tape contact surfaces 22, and hence the tape 6 runs while being pressed to the tape contact surfaces 22. Thus, the running position of the tape 6 will be positively regulated so that a deterioration in the electromagnetic conversion characteristics can be effectively prevented.

In the magnetic head device in FIG. 4, however, it has been found that once the tape 6 has snaked, it takes a very long time to restore the running position of the tape 6 to its normal position. The reason for this is as follows:

FIG. 5 is a cross sectional view, taken along line a—a' of FIG. 4, showing the vicinity of the magnetic gap G of the magnetic head device to illustrate the tape running state at the major portion thereof. FIG. 5 is vertically enlarged to make the tape running state clearer.

As shown in FIG. 5, the tape 6 is pressed against the tape sliding surface 4 of the magnetic head 1 by the pad 15. Here, the thickness of the tape 6 is usually 12–18 μm, and hence the pad 15 will be greatly deformed at both sides of the tape 6. Thus, the stress caused by the pad 15 will concentrate on both sides of the tape 6, and the pad 15 also presses the tape sliding surface 4.

If the tape 6 snakes in such a condition, the tape tension increases owing to the inclined portions 24 of the guides 21 so that a force to restore the tape 6 to its normal position is produced. The force, however, is hindered from acting because the stress of the pad 15 concentrates on both sides of the tape 6, and the deformation of the pad 15 exerts pressure on the tape sliding surface 4. As a result, in the magnetic head device shown in FIG. 4, once the tape 6 has deviated from the normal running position, it takes very long time until the tape 6 is restored to its normal position.

SUMMARY OF THE INVENTION

Accordingly, it is an object of the present invention to provide a method for fabricating a magnetic head that can eliminate the above-described disadvantages associated with the conventional techniques.

It is another object of the present invention to provide a magnetic head that can prevent the projections from peeling off from the head surface.

It is still another object of the present invention to provide a magnetic head that can correctly regulate the sliding position of the tape, and in addition, that can quickly restore the tape to the normal position, even if the tape deviates therefrom.

According to a first aspect of the present invention, there is provided a method for manufacturing a magnetic head for use with a magnetic tape which slides relative to the magnetic head and which is pressed by a pad against a tape sliding surface of the magnetic head so as to perform magnetic recording or reproduction of information, the method comprising the steps of:

transferring a liquid resin to the tape sliding surface by using screen printing; and hardening the liquid resin transferred to the tape sliding surface, thereby forming a pair of projections on the tape sliding surface, the projections being placed at either side of a path taken by the magnetic tape while it slides relative to the magnetic head, and making contact with both end portions of the pad.

Here, the projections may be formed so that traces of fine meshes of a screen employed during the screen printing procedure remain on the surfaces of the projections.

A method for manufacturing a magnetic head may further comprise the step of performing mirror-like finishing on the tape sliding surface of the magnetic head.

According to a second aspect of the present invention, there is provided a magnetic head for use with a magnetic tape which slides relative to the magnetic head and which is pressed by a pad on against tape sliding surface of the magnetic head to perform magnetic recording or reproduction of information, the magnetic head comprising:

magnetic cores; and a pair of projections which are formed on the tape sliding surface of the magnetic head by using screen printing, and are disposed in such places where they make contact with both end portions of the pad that protrude beyond both sides of the magnetic tape sliding on the sliding surface.

Here, the projections may have traces of fine meshes of a screen employed during the screen printing procedure on the surfaces of the projections.

Each of the projections may have a plurality of projection segments.

Each of the projections may be composed of a number of round projection segments.

Each of the projections may be composed of a number of oval projection segments.

According to a third aspect of the present invention, there is provided a magnetic head for use with a magnetic tape which slides relative to the magnetic head and which is pressed by a pad against a tape sliding surface of the magnetic head to perform magnetic recording or reproduction of information, the magnetic head comprising:

magnetic cores; and a pair of projections which are disposed at both sides of the magnetic cores in such a manner that they make contact with both ends of the pad, and which have a plurality of projection segments.

Here, each of the projections may be composed of a number of round projection segments.

Each of the projections may be composed of a number of oval projection segments.

According to a fourth aspect of the present invention, there is provided a magnetic head for use with a magnetic tape which slides relative to the magnetic head and which is pressed by a pad against a tape sliding surface of the magnetic head to perform magnetic recording or reproduction of information, the magnetic head comprising:

magnetic cores; and a pair of projections which are disposed at both sides of magnetic cores in such a manner that they make contact with both ends of the pad, and which have a plurality of projection segments; and a tape guide which comprises a reference surface for regulating the position of the magnetic tape on the tape sliding surface of the magnetic head by making contact with a side edge of the magnetic tape, and an inclined surface for forcing the other side edge of the magnetic tape to the reference surface.

Here, the tape guide may be provided at both sides of the tape sliding surface, along the direction of movement of the magnetic tape.

The tape guide may further comprise a position regulating surface for regulating the position of the magnetic tape in the direction of thickness of the magnetic tape passing between the reference surface and the inclined surface, the position regulating surface comprising a curved sliding surface which keeps contact with the magnetic tape.

The projections may extend along the moving direction of the magnetic tape.

Each of the projections may have a plurality of projection segments.

Each of the projections may be composed of a number of round projection segments.

Each of the projections may be composed of a number of oval projection segments.

The position regulating surface may have a longitudinal length shorter than the width of the magnetic tape.

According to the first aspect of the present invention, the projections are formed by using a screen printing procedure which can accurately and quickly form the projections, thereby increasing productivity. In addition, the projections have good adhesion to metal and resin materials constituting the magnetic head.

According to the second aspect of the present invention, a plurality of projections are formed at either side of the tape using screen printing. This prevents the projections from peeling off from the head surface due to compressive stress during film formation, and in addition, even if some projections fall off from the head surface, the remaining projections can prevent adverse effects such as increased sliding friction or wow and flutter.

According to the fourth aspect of the present invention, the projections can reduce the pressure of the pad against the tape sliding surface of the magnetic head, thereby stabilizing the tape speed and reducing wear surface. Furthermore, the tape can be quickly restored its normal position after the tape has deviated from its normal position without being hindered by the pressure of the pad against the tape sliding surface. This is because the projections reduce the pressure of the pad against the tape sliding surface and the tape guide causes a force which presses the tape to the reference surface, and these effects cooperate to prevent the pressure of the pad against the tape sliding surface from having an adverse effect.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The invention will now be described with reference to the accompanying drawings.

Embodiment 1

Figure 7:
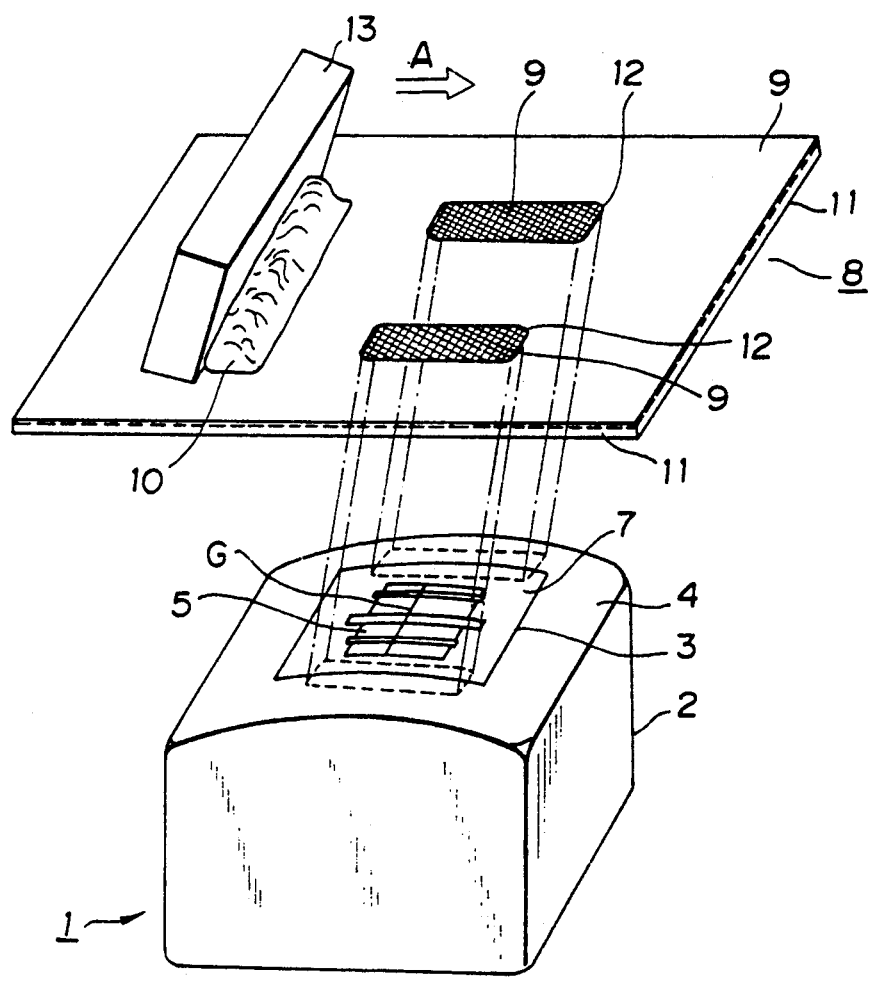
FIG. 7 is a perspective view showing a step in a method of fabricating a magnetic head in accordance with a first embodiment of the present invention.

FIG. 7 is a perspective view showing a step in a method of fabricating a magnetic head in accordance with a first embodiment of the present invention.

A magnetic head 1 comprises a shield case 2 having a window 3, a pair of cores 5 which are butted at their ends via a gap G, and which are disposed in the shield case 2 in such a manner that they face the window 3 of the shield case 2; and a fixing member 7 made from an epoxy resin. A tape sliding surface 4 of the magnetic head 1, on which the tape slides, undergoes mirror-like finishing so that the radius of curvature of the sliding surface 4 becomes 12 mm.

A plate supporter 8 supports a screen 9 and a stencil screen 11. The screen 9 is made of 200 line/in mesh whose thickness is 30 μm. The stencil screen 11 is provided for preventing the transfer of a liquid resin 10. The total thickness of the plate supporter 8 is 80 μm. In the plate supporter 8, two print images 12 are formed corresponding to the positions and shapes of projections which will be described later. The plate supporter 8 is placed on the magnetic tape sliding surface 4 of the head 1, which has undergone mirror-like finishing, and the liquid resin 10 is transferred to the sliding surface 4.

Here, the liquid resin 10 of the present embodiment is made from the following materials: 100 parts of bisphenol A-diglycidyl-ether-diacrylate as an UV oligomer; 10 parts of bis-(2-hydroxyethyl-methacrylate)ester of phosphoric acid as a metal-adhesion-reinforcement monomer; 10 parts of benzo-fenon as a light reaction starting agent; 6 parts of moder-flow (flowing moderating agent) as a thixotroping agent; 0.5 parts of phthalocyanine blue of as a pigment; 0.5 parts of silane coupling agent; and 130 parts of fine silica particles as a filler.

The following procedure was used to fabricate a head 10:

First, these materials were stirred in a vacuum mixer shielded from light for 30 minutes, thereby producing a high viscosity liquid resin 10. The liquid resin 10 was placed on the screen supporter 8 as shown in FIG. 7 was transferred to the tape sliding surface 4 of the magnetic head 1 by sliding a squeegee 13 in the direction indicated by the arrow A.

Figure 8:
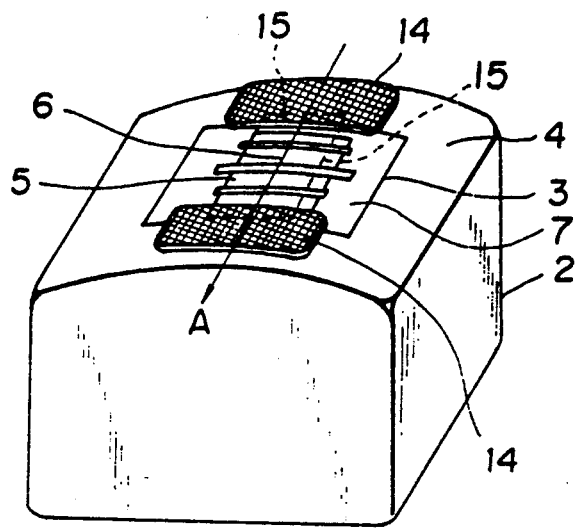
FIG. 8 is a perspective view showing a magnetic head fabricated by the method of the first embodiment of the present invention.

After that, the transferred liquid resin 10 was irradiated by ultraviolet light whose central wavelength was 365 nm and whose illuminance was 100 mW/cm$^2$ for 30 seconds, thereby hardening the resin. The resulting magnetic head 1 had projections 14 on which fine traces of screen meshes had been formed as shown in FIG. 8. In this case, the thickness of the projections 14 was 60 μm.

Figure 1A:
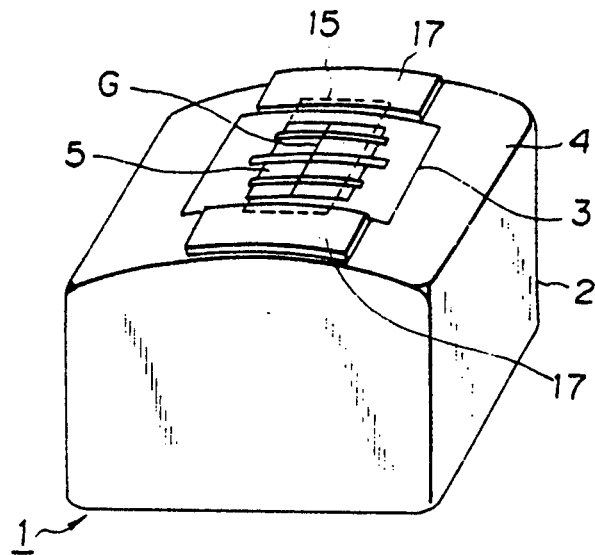
FIGS. 1A and 1B are perspective views showing conventional magnetic heads for cassette tape recorders.

FIG. 1A is a perspective view showing a conventional magnetic head, for comparison with the magnetic head of FIG. 8 produced by the method of the first embodiment of the present invention. The conventional head of FIG. 1A has projections 17 formed by electrodeposition in a copper sulfate solution with a mask covering the sliding surface 41. The copper in the solution is deposited to form projections 17 at a rate of 1 μm/sec, and the projections 17 are formed in one hour. The body of the magnetic head 1 itself has the same construction as that of FIG. 8.

The speed of forming the projections 14 of the embodiment is much faster than that of forming the projections 17 of the conventional head. In addition, the area in which conventional projections 17 make contact with a pad 15, shown by broken lines in FIG. 1A, is very limited because the electrodeposition can be conducted only on the metal case 2 of the conventional magnetic head. In contrast, in the present invention, the ends of the pad 15 can be securely placed on the projections 14 because the projections 14 can be formed not only on the case 2 but also on the fixing member 7.

For comparative purposes, a head having the projections 14 of FIG. 8 was produced using another liquid resin, of low viscosity, which had the same composition as the liquid resin 10 except that it included no filler. A plate supporter with a total thickness of which is 40 μm was used. The plate supporter included a stencil screen and a screen made of 200 line/in mesh whose thickness was 30 μm, and two print images 12 were formed corresponding to the positions and shapes of projections. Using the liquid resin and the plate supporter, the low viscosity resin was transferred to the sliding surface 4 by screen printing, and was hardened by irradiation with ultraviolet light, thereby forming projections corresponding to the projections 14.

Figure 9:
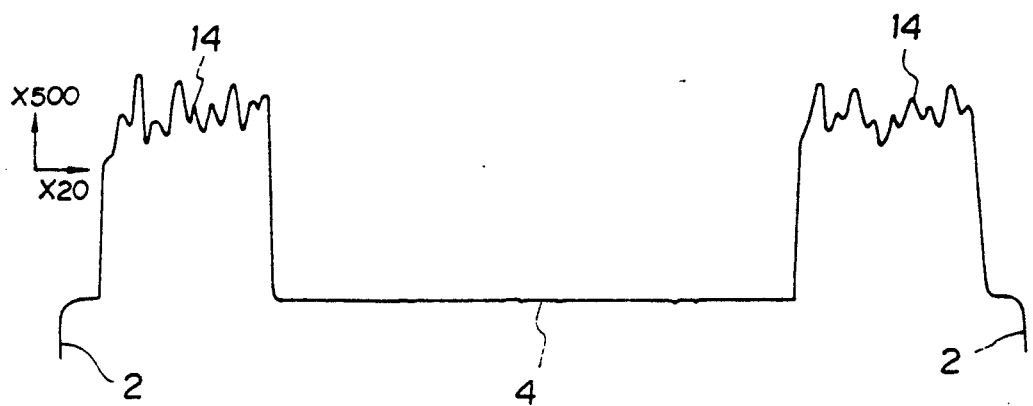
FIG. 9 is a diagram showing the surface roughness of a magnetic head fabricated by the method of the first embodiment.
Figure 10:
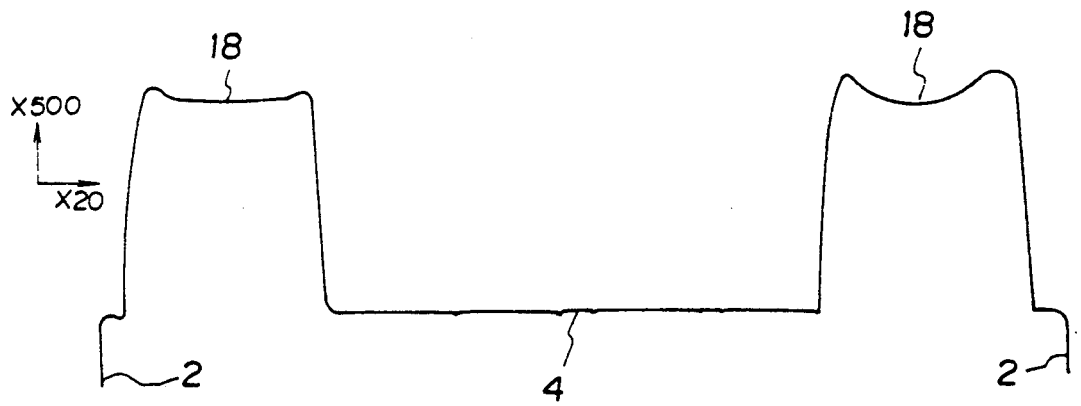
FIG. 10 is a diagram showing the surface roughness of a comparative head whose projections are formed by using a low viscosity resin.

FIG. 9 is a diagram showing the surface roughness of the magnetic head 1 fabricated by the method of the present embodiment. The surface roughness was measured by moving a surface roughness tester in the direction of the arrow A in parallel with the gap line G of FIG. 8. FIG. 10 is a diagram showing the surface roughness of the comparative head whose projections were formed by using the low viscosity resin. FIGS. 9 and 10 clearly show that a trace of fine meshes is formed on the projections 14 of the head produced by the method of the present embodiment, whereas no trace thereof remains on the projections 18 of the comparative head because the meshes were filled by the low viscosity resin.

Next, an adhesion test of the projections was carried out with regard to the head fabricated by the method of the present embodiment and with regard to the comparative head. Adhesive tapes were stuck to the entire sliding surfaces of the two heads, and were exposed to air at room temperature for two hours. After that the adhesive tapes were held by an end and peeled from the sliding surfaces at a pull speed of 50 mm/min. No removal of the projections took place with regard to 20 heads fabricated by the method of the present embodiment, whereas projections were removed from three heads out of 20 comparative heads.

Thus, there is little possibility of the removal of the projections from heads fabricated by the method of the present embodiment because of the trace of fine meshes.

Examples of liquid resins which can be used in the screen printing. Include natural resins, synthetic resins, fiber based resins, gum resins, or the like. These resins have good adhesion both to the metal case and the resin fixing member of the sliding surface. Above all, synthetic resins are especially appropriate for the purpose. Thermoplastic and thermosetting synthetic resins can be used, but thermosetting resins are preferable because liquid thermosetting resins are less susceptible to hardening on the screen plate. Any of the ordinary temperature hardening type, thermosetting type, or photosetting type, or a mixture thereof, can be used as long as they are thermosetting resins, and in particular, the photosetting type is preferably used during quantity production to promote efficiency. Major examples of thermosetting resins include alkyd resins, amino resins, epoxy resins, polyurethane resins, photosetting resins, or the like, together with variations thereof. Among these, epoxy resins, polyurethane resins and photosetting resins are superior with regard to efficiency during quantity production and with regard to adhesion with the metal case and fixing member.

Additional materials such as colorants, solvents, deformers, dispersants, leveling agents, reducers, fillers, suspending agents, coupling agents, and UV absorbents may be added to these resins to form the liquid resin.

With an appropriate screen thickness and other screen printing conditions for the liquid resins mentioned above, it possible to make projections of a desired thickness with high precision.

The curved surface screen printing method is preferably employed. In this method, printing is performed while the magnetic head is rotated and good transfer of the liquid resin can be achieved because the tape sliding surface of the magnetic head is curved and has a radius of curvature which ranges from 4 mm to 15 mm. In contrast with this, in the flat screen printing method the printing is performed while the magnetic head is fixed to a finisher's slab (or surface plate), the transfer of the liquid resin worsens as the radius of the sliding surface becomes smaller. This can be improved by making the printing images formed by the screen printing approximately circular. One of the two printing methods can be chosen by taking into account the transfer of the liquid resin and the efficiency of printing.

The projections may be formed as single layer printed projections or as multilayer printed projections. In either case, it is preferable that the projections have traces of fine meshes of the screen plate on their solidified surfaces. This is because the traces of fine meshes can disperse the compressive stress which is produced along the film surface when the liquid resin hardens, owing to the projection film thickness of several ten to several hundred μm. The dispersal of the compressive stress promotes adhesion of the projections. For this purpose, 20–400 line/in mesh screen is suitable; otherwise, the film thickness of the projections would become unstable, or the passage of the liquid resin through the screen would be hindered.

By using one of these screens, as well as taking into account the viscosity of the liquid resin, the pressure and sliding speed of the squeegee, the distance between the screen plate and the sliding surface of the head, and the like, the traces of fine meshes can be easily formed on the surfaces of the resin materials transferred to the sliding surface of the magnetic head. Furthermore, the thickness of the projections formed on the sliding surface of the head can be easily altered by changing the thickness of the screen or that of the stencil screen thereon (thereunder) for stopping the passage of the liquid resin.

Embodiment 2

Figure 11:
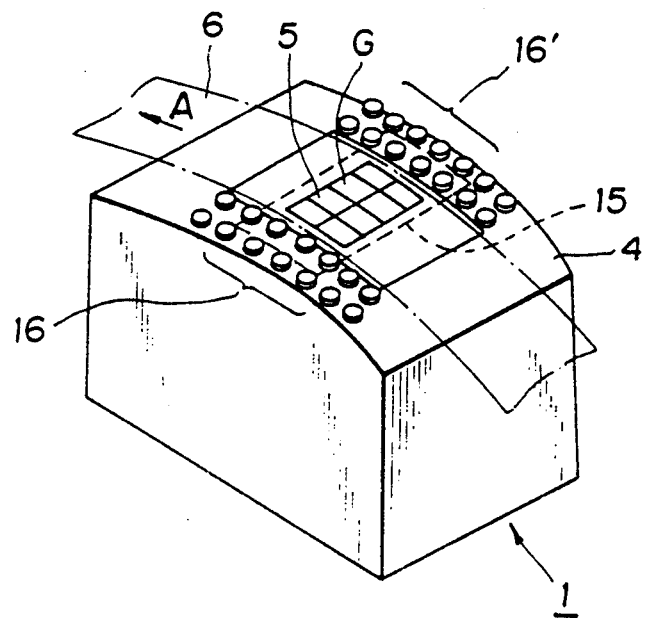
FIG. 11 is a perspective view showing a magnetic head for cassette tape recorders according to a second embodiment of the present invention.

FIG. 11 is a perspective view showing a magnetic head for cassette tape recorders according to a second embodiment of the present invention.

As shown in FIG. 11, a 4-channel magnetic core 5 having a gap G is exposed in the center of a magnetic tape sliding surface 4 of a magnetic head 1. Against this sliding surface 4, a magnetic tape 6 is pressed by a pad 15 which is shown by broken lines in this figure, and slides in the direction of an arrow A, thereby performing recording or reproduction.

On the magnetic tape sliding surface 4, two groups of projections 16 and 16' are provided in such a manner that they are placed at both sides of the tape 6 along the tape sliding direction. Portions of the group of the projections 16 and the group of projections 16' make contact with the pad 15.

Next, a method for forming the projection groups by using screen printing will be explained.

A screen plate used during fabrication of this embodiment of the present invention had a screen and a stencil screen, and was 90 μm thick. The screen was made of 200 line/in mesh screen of 30 μm thickness. The stencil screen was provided for preventing the passage of a liquid resin. Print images corresponding to the projections of FIG. 11 were provided in this screen plate. In addition, a comparative screen plate was prepared which had the same arrangement as the above screen plate except that it had a pair of plate images corresponding to the projections 17 of FIG. 1B.

Figure 1B:
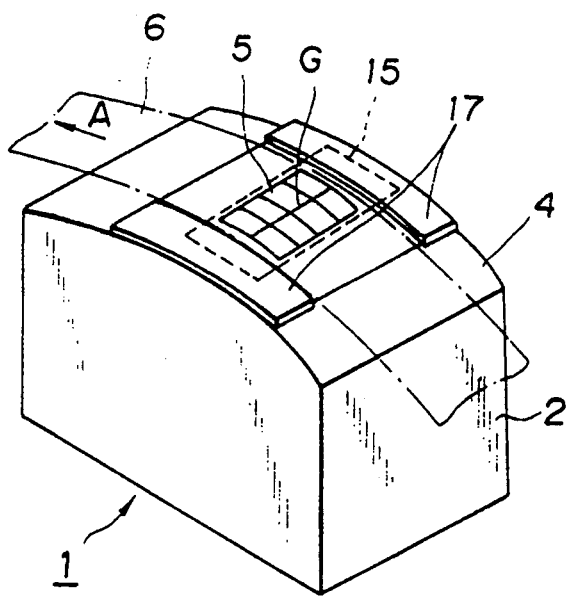

Screen printing was carried out using a liquid resin UVX-507 (which is a product of Three Bond Corp), an ultraviolet setting resin. First, the liquid resin was transferred to the sliding surfaces of 4-channel magnetic heads through the plate images of the two types of screen plates in such a manner that the transferred resins were placed at both sides of the tape passage along the tape sliding direction. After that, the transferred resins were irradiated with ultraviolet light whose wavelength was 365 nm and whose illuminance was 200 mW/cm$^2$. Ten magnetic heads as shown in FIG. 11 according to this embodiment were made along with ten comparative magnetic heads having projections as shown in FIG. 1B. The adhesion between the tape sliding surface 4 and the projections was then tested. The heads were subjected to a thermal cycle test in which they were exposed to −40° C. for 30 minutes and 80° C. for 30 minutes for 200 alternations. After that, the projections on the sliding surfaces 4 of the magnetic heads were inspected. With regard to the heads of the embodiment, no projections of the groups 16 and 16' had peeled, whereas with regard to the comparative heads, partial peeling was found on six heads, and complete peeling was found on two heads.

Embodiment 3

Figure 12:
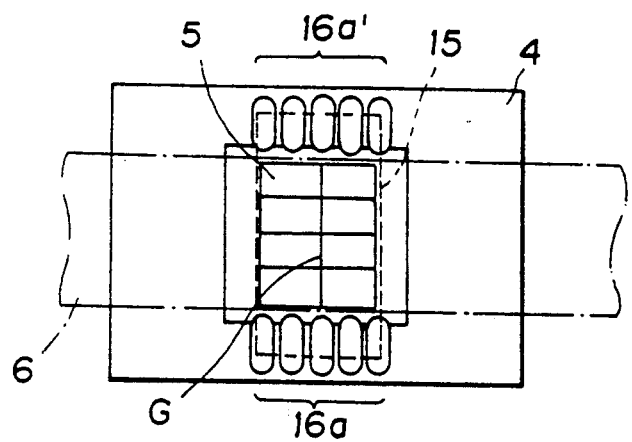
FIG. 12 is a plan view showing the construction of the tape sliding surface of a magnetic head according to a third embodiment of the present invention.

FIG. 12 is a plan view showing the tape sliding surface of a magnetic head according to a third embodiment of the present invention. Like parts in FIGS. 11 and 12 are indicated by the same reference numerals.

In this embodiment, two projection groups 16a and 16a' are formed on the sliding surface 4 so that a part of each projection makes contact with the pad 15. Each group consists of a plurality of oval projections which are disposed in parallel so that their major axes are normal to the tape sliding direction.

It will be clear that the magnetic head shown in FIG. 12 can achieve an effect similar to that of the magnetic head shown in FIG. 11.

The shapes of the projections in the groups are not restricted to those shown in FIGS. 11 and 12. Furthermore, the projections in the same group may have different shapes, and the heights of the projections from the sliding surface of the head may differ each other.

Embodiment 4

Figure 2:
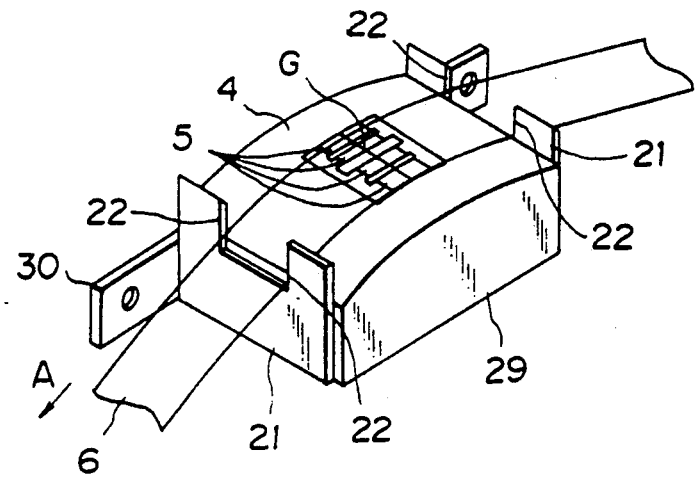
FIG. 2 is a perspective view showing a conventional head having a tape guide portion.
Figure 4:
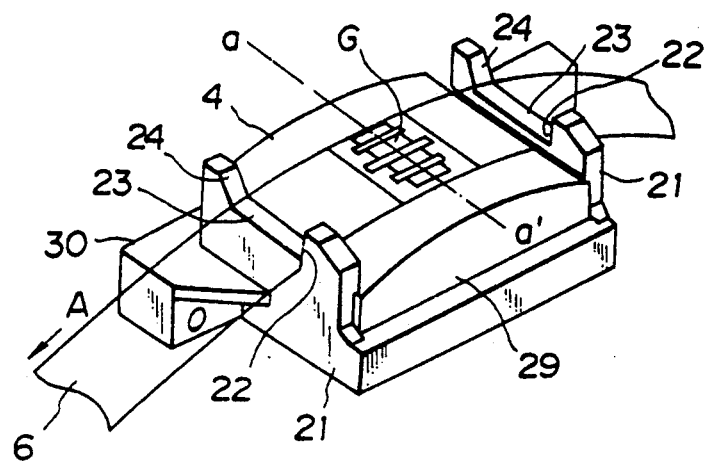
FIG. 4 is a perspective view showing another conventional magnetic head.
Figure 5:
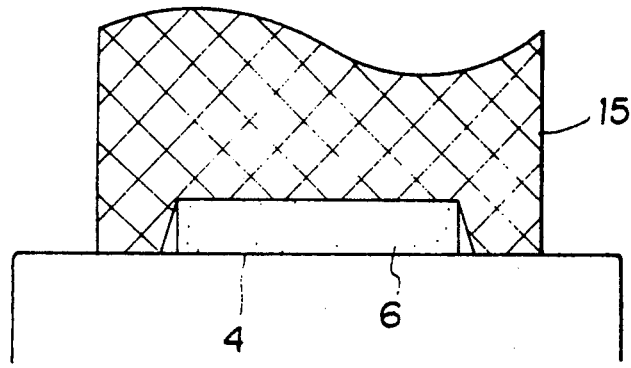
FIG. 5 is a cross-sectional view, taken along line a—a' of FIG. 4, showing the vicinity of the magnetic gap of the magnetic head to illustrate the tape running state at the major portion of the head.
Figure 13:
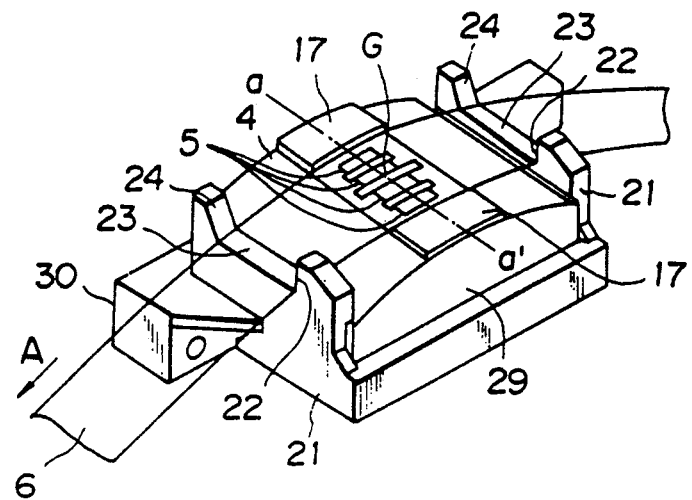
FIG. 13 is a perspective view showing a magnetic head in accordance with a fourth embodiment of the present invention.

FIG. 13 is a perspective view showing a magnetic head in accordance with a fourth embodiment of the present invention. In this embodiment, the present invention is applied to a 4-channel head for an auto-reverse type cassette tape recorder as in FIG. 2 or FIG. 4. Like parts in FIGS. 13, 2 and 4 are designated by the same reference numerals.

A pair of magnetic cores installed in a case 29 as shown in FIG. 13 are butted via a magnetic gap G, thus forming a part of a tape sliding surface 4 of a magnetic head 1.

Two guides 21 are provided for defining the running position of a tape 6. Each guide 21 has a tape contact surface 22, a curved sliding surface 23, and an inclined surface 24. The tape contact surface 22 is upright and serves as a reference surface for regulating the position of the tape 6, one side of contacts the surface 22. The curved sliding surface 23, keeping contact with the bottom surface of the tape 6, defines the tape position in its thickness direction. The inclined surface 24 forms a slope on which the other side of the tape 6 contacts.

In addition, the magnetic head device of the embodiment has a pair of projections 17. They are disposed in the vicinity of the magnetic gap G on the tape sliding surface 4 in such a manner that they make contact with both ends of the pad 15 at both side of the magnetic tape 6 without touching the tape. Thus, the pressure of the pad 15 on the tape 6 is lessened by the projections 17.

Figure 14:
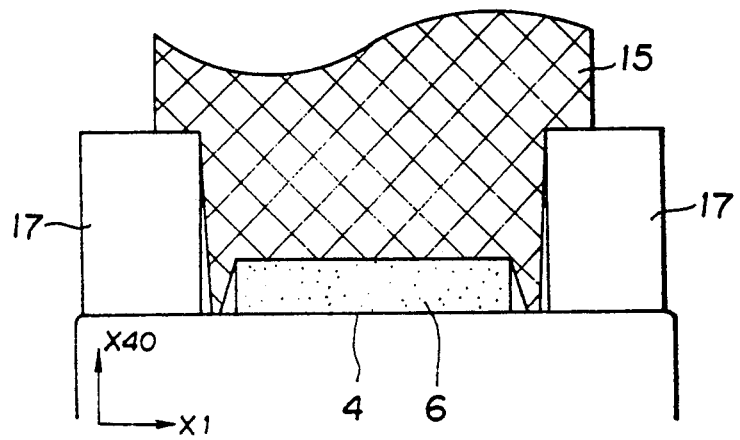
FIG. 14 is a cross-sectional view showing a major portion of the magnetic head to illustrate the tape sliding in the vicinity of the magnetic gap.

FIG. 14 is a cross sectional view showing the major portion of the magnetic head to illustrate the tape sliding in the vicinity of the magnetic gap. In this figure, the vertical direction is enlarged for the sake of clarity.

If the tape 6 begins snaking or the like, it runs onto the inclined surface 24 of the guide 21, thereby increasing the tension of the tape. This tension acts on the tape 6 so as to restore the running position of the tape to the normal position, wherein one side of the tape 6 touches the tape contact surface 22 as the reference surface. The tension shift of the tape 6 from a deviated position to the normal running very smoothly because the pressure of the pad 15 on the tape is greatly lessened by the pair of projections 17 as shown in FIG. 14.

Thus, in the magnetic head of the present embodiment, if the tape 6 deviates from the normal running position, it can quickly return to its normal position. Furthermore, since the projections 17 lessen the pressure of the pad 15 on the tape sliding surface so that the sliding friction of the tape is restricted to a small amount, not only is the speed of the tape 6 stabilized, but also the wear of the tape sliding surface 4 of the head 1 is lessened.

Figure 3:
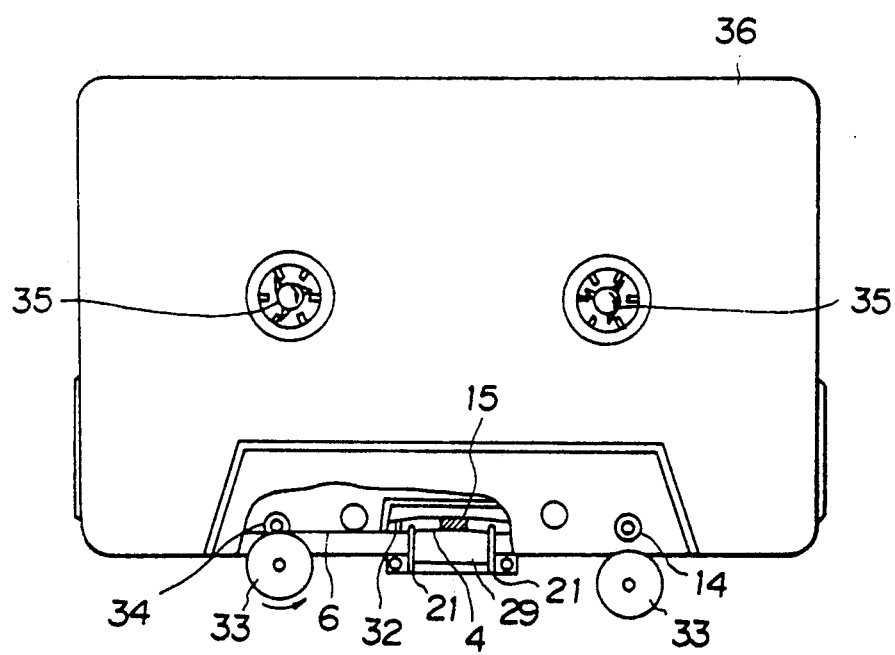
FIG. 3 is a plan view, partially broken away, showing the cassette with magnetic tape which slides with respect to a magnetic head.
Figure 6:
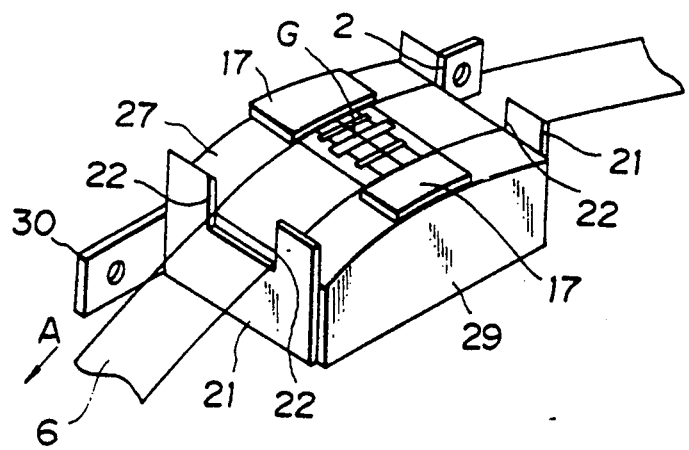
FIG. 6 is a perspective view showing still another example of a conventional magnetic head.

To test the fourth embodiment, the following experiment was carried out: first, a magnetic head the accordance with the present embodiment was installed to a commercially available head-phone stereo tape recorder, a part of which is shown in FIG. 3. Second, a tape on which a signal of 12.5 kHz was recorded was loaded and set in running condition. Third the headphone stereo tape recorder was dropped on a desk from the height of 10 cm above the desk in the direction lateral to the tape, namely, in the direction normal to FIG. 3, so that the tape 6 was forced to snake. Finally the recovery time was measured from the point at which the stereo tape recorder dropped on the desk to the point at which the reproduced output was restored to the normal condition. These procedures were repeated for conventional magnetic heads as shown in FIGS. 2, 4, and 6.

The dimensions of the magnetic head of the embodiment shown in FIG. 13 were as follows: The minimum distance from the tape contact surface 22 of the guide 21 to the inclined surface 24, that is, the longitudinal length of the curved sliding surface 23, was specified at 3.72 mm. This means that a tape 6 with a width of about 3.76–3.81 mm runs with its side edge running onto the inclined surface 24 by 0.04–0.09 mm, thereby increasing the tension of the tape 6 at the inclined surface side so as to press the other side of the tape 6 to the tape contact surface 22. The thickness of the projections 17 was 70 μm, and the distance between the two projections 17 was 4.2 mm.

The space between the pair of the tape contact surfaces 22 of the conventional magnetic head device as shown in FIG. 2 was about 3.82 –3.87 mm. The dimensions and the shape of the guide 21 of the conventional magnetic head device as shown in FIG. 4 were identical to those of the magnetic head device of FIG. 13. The conventional magnetic head device as shown in FIG. 6 had guides 21 similar to those of FIG. 2, and had the pair of projections 17 similar to those of FIG. 13. The dimensions and shapes of the guides 21 and the projections 17 were identical to those of the magnetic heads of FIGS. 2 and 13, respectively.

The recovery times were measured a plurality of times. The measurements were started when the recorder collided with the desk, and were stopped when the reproduced output returned to its normal state. The average values of the recovery times of the respective magnetic heads were as follows:

| | |
|---|---|
| magnetic head of FIG. 13 | 0.04 sec |
| magnetic head of FIG. 2 | 1.44 sec |
| magnetic head of FIG. 4 | 0.72 sec |
| magnetic head of FIG. 6 | 1.41 sec |

As is clear from these results, the magnetic head of the present embodiment has a large capability for restoring the tape 6 to its normal running position after snaking or the like has caused the tape to deviate from its normal running position.

The results also show that the combination of the projections 17 and the guides 21 of the magnetic head of the embodiment provide a capability which is absent from the conventional magnetic head devices shown in FIGS. 2, 4 and 6. That is, the combination makes it possible for the magnetic head to quickly restore the tape to its normal running position if it deviates therefrom.

The process for fabricating the magnetic head shown in FIG. 13 is as follows: First, the projections 17 are formed as films of a UV resin, epoxy resin, or the like, on the head body, which is composed of magnetic cores 5, case 29, etc. Screen printing is used to form the films. A shaped member, which is made from a polyamide resin or the like, and which has integrally formed guides 21 and mounting legs 30 for mounting the head on the body of a cassette deck, is then joined with the head body by adhesives.

Embodiment 5

Figure 15:
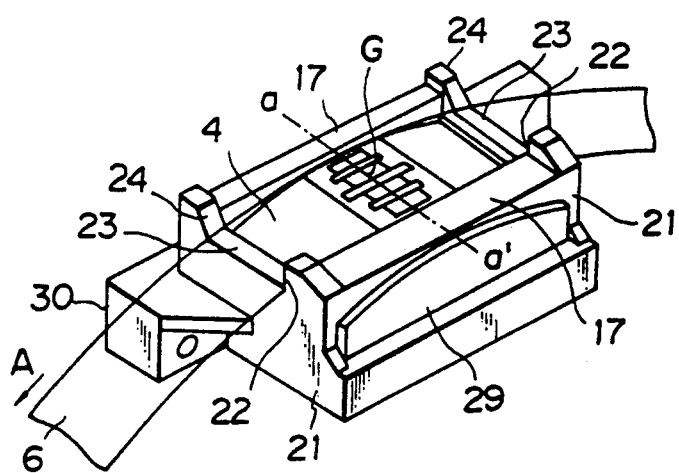
FIG. 15 is a perspective view showing as a fifth embodiment of the present invention.

FIG. 15 is a perspective view showing a magnetic head in accordance with a fifth embodiment of the present invention. In FIGS. 15 and 13, like parts are designated by the same reference numerals. The magnetic head in FIG. 15 has guides 21, mounting legs 30 and projections 17 which are unified by using a molding material. In this magnetic head, a high unification precision of the guides and the head body is required for determining the positional relation between the guides 21 and the projections 17.

It will be clearly seen that the magnetic head of the embodiment can achieve an effect similar to that shown in FIG. 13.

Incidentally, it is preferable that the thickness of the projections 17 in the fourth and fifth embodiments be 0.005-0.20 mm. If the thickness is less than 0.005 mm the effect of the projections is not clear. If the thickness is more than 0.20 mm, the pressure of the pad on the tape was so lessened that the tape sliding surface of the head does not make sufficient contact with the tape, and the electromagnetic conversion characteristics deteriorate.

Furthermore, although in the above embodiments 4 and 5, guides are provided at both the upstream and downstream ends of the head, guides at only one end can be used. In addition, the shape of the guide 21 is not limited to that shown in FIGS. 13 and 15. A similar effect can be expected by any shape as long as the guide 21 has a reference surface that keeps contact with a side edge of the tape so as to regulate the position of the tape on the tape sliding surface of the head, and an inclined surface that forces the tape toward the reference surface by pushing the other side edge of the tape. For example, a structure wherein the tape sliding surface by itself guides the tape can be used instead of the curved sliding surface 23 to achieve a similar effect.

In addition, the combination of the projections 17 and the guides 21 can be replaced with any one of the combinations of projections 14 in FIG. 8 and the guides 21, projection groups 16 and 16' in FIG. 11 and the guides 21, and projection groups 16a and 16a' in FIG. 12 and the guides 21.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A magnetic head for use with a magnetic tape which slides relative to said magnetic head and which is pressed by a pad against a tape sliding surface of said magnetic head to perform magnetic recording or reproduction of information, said magnetic tape having parallel edges and said pad having a pair of end portions which extend beyond said edges of said magnetic tape, said magnetic head comprising:
   magnetic cores; and
   a pair of projections which are formed on said tape sliding surface of said magnetic head having said magnetic cores, said projections being disposed at locations where they make contact with both end portions of said pad, said projections having traces of fine meshes of a screen plate on the surfaces thereof.

2. A magnetic head as claimed in claim 1, wherein each of said projections has a plurality of projection segments.

3. A magnetic head as claimed in claim 2, wherein each of said projections is composed of a number of round projection segments.

4. A magnetic head as claimed in claim 2, wherein each of said projections is composed of a number of oval projection segments.

5. A magnetic head as claimed in claim 1, wherein the traces of fine meshes on the surfaces of both projections are identical.

6. A magnetic head as claimed in claim 1, wherein the projections have thicknesses that are identical.

7. A magnetic head as claimed in claim 1, wherein said projections are formed by hardening a high viscosity liquid resin.

8. A magnetic head as claimed in claim 7, wherein said liquid resin is a synthetic resin.

9. A magnetic head as claimed in claim 8, wherein said synthetic resin is a thermosetting resin.

10. A magnetic head as claimed in claim 9, wherein said thermosetting resin is a photosetting type resin.

11. A magnetic head for use with a magnetic tape which slides relative to said magnetic head and which is pressed by a pad against a tape sliding surface of said magnetic head to perform magnetic recording or reproduction of information, said magnetic tape having parallel edges and said pad having a pair of end portions which extend beyond said edges of said magnetic tape, said magnetic head comprising:
   magnetic cores; and
   a pair of projections which are disposed at both sides of said magnetic cores at positions where they make contact with both end portions of said pad, each of said projections having a plurality of projection segments.

12. A magnetic head as claimed in claim 11, wherein each of said projections is composed of a number of round projection segments.

13. A magnetic head as claimed in claim 11, wherein each of said projections is composed of a number of oval projection segments.

14. A magnetic head for use with a magnetic tape which slides relative to said magnetic head and which is pressed by a pad against a tape sliding surface of said magnetic head to perform magnetic recording or reproduction of information, said magnetic tape having parallel edges and said pad having a pair of end portions which extend beyond said edges of said magnetic tape, said magnetic head comprising:
   magnetic cores; and
   a pair of projections which are disposed at both sides of said magnetic cores at locations where they make contact with both ends of said pad, said projections having traces of fine meshes of a screen plate on the surfaces thereof; and
   a tape guide which includes a reference surface for regulating the position of said magnetic tape on said tape sliding surface of said magnetic head by making contact with one edge of said magnetic tape, and an inclined surface for forcing the other edge of said magnetic tape to said reference surface.

15. A magnetic head as claimed in claim 14, wherein said tape sliding surface has two sides, along the direction of movement of said magnetic tape, wherein said tape guide is disposed at one side of said tape sliding surface, and further comprising another tape guide disposed at the other side of said tape sliding surface.

16. A magnetic head as claimed in claim 15, wherein said magnetic tape additionally has a bottom surface which is directed toward said magnetic cores of said magnetic head and, wherein said tape guide further comprises a position regulating surface for regulating the position of said magnetic tape in the direction of thickness of said magnetic tape, said position regulating surface extending between said reference surface and said inclined surface, said position regulating surface comprising a curved sliding surface which keeps contact with said bottom of said magnetic tape.

17. A magnetic head as claimed in claim 16, wherein said position regulating surface has the longitudinal length shorter than the width of said magnetic tape.

18. A magnetic head as claimed in claim 14, wherein said magnetic tape additionally has a bottom surface which is directed toward said magnetic cores of said magnetic head and, wherein said tape guide further comprises a position regulating surface for regulating the position of said magnetic tape in the direction of thickness of said magnetic tape, said position regulating surface extending between said reference surface and said inclined surface, said position regulating surface comprising a curved sliding surface which keeps contact with said bottom of said magnetic tape.

19. A magnetic head as claimed in claim 14, wherein said projections extend along the moving direction of said magnetic tape.

20. A magnetic head as claimed in claim 14, wherein each of said projections has a plurality of projection segments.

21. A magnetic head as claimed in claim 20, wherein each of said projections is composed of a number of round projection segments.

22. A magnetic head as claimed in claim 20, wherein each of said projections is composed of a number of oval projection segments.

* * * * *